No. 691,049. Patented Jan. 14, 1902.
C. D'ESPINE.
SYSTEM OF JOINTING FOR JOINING UP BOXES, &c.
(Application filed Feb. 6, 1900.)

(No Model.)

WITNESSES:

INVENTOR
CHARLES D'ESPINE
BY Howson and Howson
HIS ATTORNEYS.

UNITED STATES PATENT OFFICE.

CHARLES D'ESPINE, OF PARIS, FRANCE, ASSIGNOR TO THE SOCIÉTÉ D'ESPINE ACHARD ET CIE., OF PARIS, FRANCE.

SYSTEM OF JOINTING FOR JOINING UP BOXES, &c.

SPECIFICATION forming part of Letters Patent No. 691,049, dated January 14, 1902.

Application filed February 6, 1900. Serial No. 4,250. (No model.)

*To all whom it may concern:*

Be it known that I, CHARLES D'ESPINE, a citizen of the Republic of France, and a resident of Paris, France, have invented an Improved System of Jointing for Boxes and the Like, of which the following is a specification.

The present invention relates to an improved system of joining up planks and boards of all kinds, replacing gluing, screwing, nailing, and the like, and is more particularly applicable in the manufacture of boxes, but also for making all the joints arising in carpentry, cabinet-making, and the like. This improved system of joining up or assembling is shown in the accompanying drawings, in which—

Figure 1:
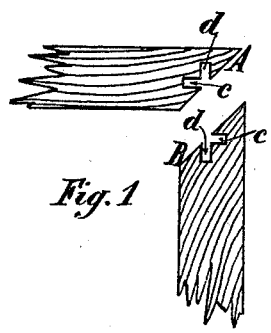
Figure 2:
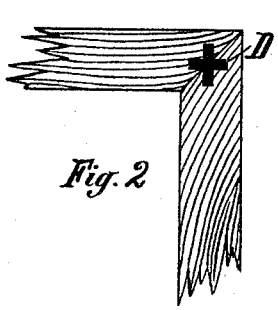
Figure 3:
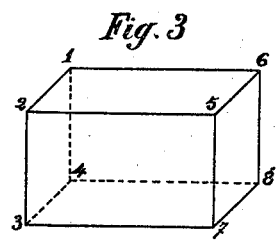
Figure 4:
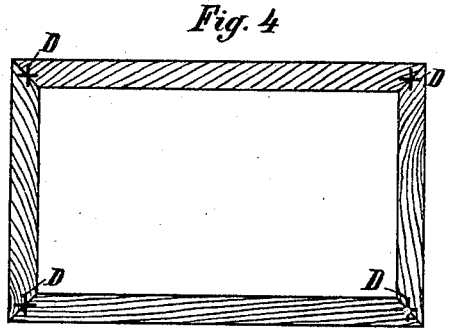
Figure 5:
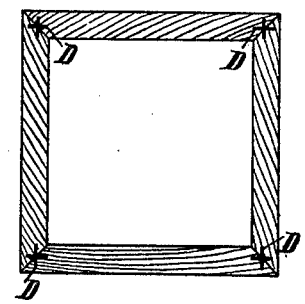
Figure 6:
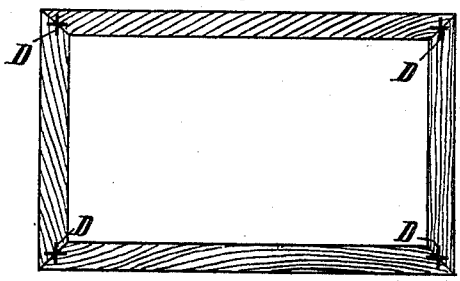

Figure 1 shows two planks ready to be joined at right angles. Fig. 2 shows these planks joined. Fig. 3 is an isometrical view of a box or case. Figs. 4, 5, and 6 are respectively a longitudinal, transverse, and horizontal section of a box or case made by this improved method of joining.

The system of joining which forms the object of the present invention is very simply carried out, it being only necessary to have at disposal a small mechanical saw, which, for that matter, is indispensable in the manufacture of boxes or in carpentry.

In case two suitable planks are to be joined so as to form between them a right angle, if the ends of these planks are prepared to form a miter-joint at forty-five degrees, as shown in Fig. 1, on each of the faces A and B of the joint two little saw cuts or grooves $c\ d$ are made, forming between them an angle of ninety degrees and an angle of forty-five degrees with the plan of the joint, thus making each groove parallel to a face of the adjoining box sides. Of course the width and depth of these grooves $c\ d$ will vary according to the dimensions of the planks or boards to be joined; but in any case they must not affect the solidity of the joint. The forming of the grooves in each of the faces A and B of the joint being thus completed, the parts to be joined are brought together, as shown in Fig. 2. The four grooves $c\ c\ d\ d$ thus placed in juxtaposition form an interstice in the form of a cross, which extends across the width of the planks or boards. In order to complete the joint, it is then sufficient to force into this free space or interstice a key D, the section of which also has the form of a cross exactly corresponding with the interstice formed by the juxtaposed grooves. When the key D has thus been put in its place, it is impossible to separate the two planks or boards, and their joint will be perfect and of great solidity, (very firm.)

If the box shown isometrically in Fig. 3 be considered, it will be easily seen that the system of joining hereinbefore described may be utilized for the four lateral faces forming the frame of the box. For this purpose four keys D will be necessary, and they will correspond to the corners 1 4, 2 3, 5 7, 6 8. If desired, the said joining might also be employed for the joints corresponding to the corners 1 6, 2 5, 3 7, and 4 8 as well as for the joints corresponding to the corners 1 2, 3 4, 5 6, 7 8. In this case it is necessary that the keys D be a little shorter than the lengths of the joints, so that none of the keys oppose the passage of a key perpendicular to each of its ends. A box may thus be obtained hermetically closed by the use of twelve keys D, four by four, perpendicular to one another.

It is understood that the method of joining hereinbefore described may also be employed for the faces and bottom of a box, the lid being fixed on in any suitable way, (nailed, screwed, fitted by means of grooves, &c.,) in order to facilitate the opening.

Figs. 4, 5, and 6 of the drawings show in detail a box all the faces of which are joined, in the manner hereinbefore described, by means of twelve keys D.

In order to join the planks or boards at right angles, it is not necessary that the miter-faces shall be at forty-five degrees. This angle may vary, and in any case this improved method of joining is applicable.

This improved system of joining is applicable to any kind of material employed for the manufacture of articles to be joined. It is applicable for joining planks of any thickness, and the keys D may be of any suitable sizes and made of any sufficiently-resistant material, such as wood, metal, ebonite, celluloid, or the like. In ordinary practice in making boxes and making carpentry-joints these keys are preferably of metal, (iron, steel, copper, or the like.)

Having now particularly described and ascertained the nature of my said invention and in what manner the same is to be performed, I declare that what I claim is—

The improvement in the manufacture of boxes, consisting of box sides, having at their joints, grooved faces, extending along the entire side, said faces each having two grooves extending into the wood of the side, each groove of equal width throughout its depth and parallel to a face of the adjoining box sides, so that when the faces are joined a keyway will be formed shaped as a cross and a key to fit the keyway, as and for the purpose described.

In testimony whereof I have signed my name to this specification in the presence of two subscribing witnesses.

CHARLES D'ESPINE.

Witnesses:
 JOSEPH DELAGE,
 EDWARD P. MACLEAN.